US012746656B2

(12) United States Patent
Jiang

(10) Patent No.: US 12,746,656 B2
(45) Date of Patent: Sep. 29, 2026

(54) TOOL HANDLE WITH HANDLE THAT IS ROTATABLE

(71) Applicant: NANTONG TIANMAO MACHINERY MANUFACTURING CO., LTD., Nantong (CN)

(72) Inventor: Bubin Jiang, Nantong (CN)

(73) Assignee: NANTONG TIANMAO MACHINERY MANUFACTURING CO., LTD., Nantong (CN)

(*) Notice: Subject to any disclaimer, the term of this patent is extended or adjusted under 35 U.S.C. 154(b) by 384 days.

(21) Appl. No.: 18/358,960

(22) Filed: Jul. 26, 2023

(65) Prior Publication Data

US 2024/0165785 A1 May 23, 2024

(30) Foreign Application Priority Data

Nov. 17, 2022 (CN) ......................... 202223057397.7
Nov. 29, 2022 (CN) ......................... 202223167582.1
Jul. 11, 2023 (CN) ......................... 202321800753.1

(51) Int. Cl.
*B25G 1/06* (2006.01)
*B25B 23/00* (2006.01)

(52) U.S. Cl.
CPC .......... *B25G 1/063* (2013.01); *B25B 23/0014* (2013.01)

(58) Field of Classification Search
CPC .... B25G 1/066; B25G 1/063; B25B 23/0014; B25B 23/0028; B25F 1/04
USPC ........................................................... 81/489
See application file for complete search history.

(56) References Cited

U.S. PATENT DOCUMENTS

| | | | | |
|---|---|---|---|---|
| 1,380,643 A * | 6/1921 | Eagle | B25G 1/063 | 81/177.7 |
| 6,349,620 B1 * | 2/2002 | Anderson | B25G 1/063 | 81/177.9 |
| 6,412,373 B1 * | 7/2002 | Hsiao | B25G 1/063 | 81/177.75 |
| 7,146,886 B1 * | 12/2006 | Wu | B25G 1/063 | 81/177.8 |
| 8,117,951 B2 * | 2/2012 | Brobst | B25G 3/38 | 81/177.8 |
| 8,464,616 B2 * | 6/2013 | Chang | B25G 1/063 | 81/177.85 |

* cited by examiner

*Primary Examiner* — Hadi Shakeri

(57) ABSTRACT

A tool handle with a handle that is rotatable includes a tool head, a tool bar, and the handle. The handle is rotatably connected to a first end of the tool bar. The tool head is rotatably connected to a second end of the tool bar. Through rotations of the tool head and the handle, the tool handle has five states. In a first state, the tool handle is in a Z-shaped structure. In second state and fourth states, the tool handle is in an L-shaped structure. In a third state, the tool handle is in an I-shaped structure. In a fifth state, the tool handle is in a U-shaped structure. When the tool handle is in the second state or the fourth state, the handle cooperates with the tool bar to form an extended moment arm, and switch the tool handle between the second and fourth states.

12 Claims, 8 Drawing Sheets

TOOL HANDLE WITH HANDLE THAT IS ROTATABLE

TECHNICAL FIELD

The present disclosure relates to a technical field of hand tools, and in particular to a tool handle with a handle that is rotatable.

BACKGROUND

A tool handle is a fastening tool which is generally configured to install and disassemble various parts (such as a car tire) of a vehicle.

In order to save manpower, a conventional tool handle is generally L-shaped. The conventional tool handle generally comprises a tool head and a tool bar perpendicular to the tool head. The tool bar is acted as an extended moment arm, so an operator is able to apply a small force to a workpiece to output a large torque through the tool handle, thereby tightly fastening the workpiece or quickly loosening the workpiece to disassemble the workpiece. However, the operator needs to hold the tool bar to rotate the conventional tool handle during a rotation process. After the tool bar rotates by a certain angle, the operator needs to loosen his hand and rehold the tool bar so that the operator is able to apply force to the tool bar again to make the tool bar continue to rotate. During the rotation process, the operator needs to frequently release and rehold the tool bar to apply the force to the tool bar, resulting in a reduction in efficiency of the conventional tool handle, which slows down a speed of installation and disassembly of the workpiece.

In addition, on another case, in order to facilitate a rotation of the conventional tool handle, a handle is disposed on one end of the tool bar away from the tool head, which is convenient for the operator to apply force. The handle is fixedly connected to the tool bar acting as the extended moment arm, and the operator holds the handle to drive the tool bar to rotate around the tool head. Although the rotation of the conventional tool handle is convenient, it is inconvenient for a storage of the conventional tool handle.

Therefore, the present disclosure proposes a tool handle with a handle that is rotatable to solve above problems.

SUMMARY

A technical problem to be solved by the present disclosure is to provide a tool handle with a handle that is rotatable, which is convenient for holding and rotating, meets a demand for high torque, and is convenient for storage.

To solve the technical problem, the present disclosure provides the tool handle with the handle that is rotatable. The tool handle comprises a tool head, a tool bar, and the handle.

The tool head, the tool bar, and the handle are disposed in a same plane. The tool head is connected to a first end of the tool bar. The handle is rotatably connected to a second end, away from the tool head, of the tool bar through a first rotating structure. The handle is switched between a first position and a second position. When in the first position, a central axis of the handle is parallel to a central axis of the tool head. When in the second position, the central axis of the handle and a central axis of the tool bar are on a same line.

Optionally, the first rotating structure comprises a first connecting head, a first positioning column, and a second connecting head. A first groove is defined on the second connecting head. The first connecting head is inserted into the first groove and is rotatable in the first groove. The first connecting head is rotatably disposed in the first groove through a first rotating shaft. A second groove is defined in a bottom surface of the first groove. The first positioning column is extendable or retractable from the second groove. The first positioning column is movably installed in the second groove. The first positioning column is connected to a bottom surface of the second groove through a first spring.

A first positioning groove and a second positioning groove are defined on a side wall of the first connecting head. The first positioning column is inserted into the first positioning groove or the second positioning groove to enable the handle to switch between the first position and the second position. A surface of the side wall of the first connecting head between the first positioning groove and the second positioning groove is a first arc-shaped curved surface.

Optionally, the first connecting head is disposed on the tool bar, the second connecting head is disposed on the handle.

Optionally, first limiting protrusions are respectively disposed on one side of the first positioning groove away from the first arc-shaped curved surface and one side of the second positioning groove away from the first arc-shaped curved surface. A first spherical protrusion is disposed on one end of the first positioning column close to the first connecting head. The first spherical protrusion is matched with the first positioning groove and the second positioning groove.

Optionally, the tool head comprises a TORX hole structure, and the tool head is fixedly connected to the tool bar.

Optionally, the tool head is of a hexagonal rod-shaped structure or a quadrangular rod-shaped structure. The tool head is rotatably connected to the tool bar through a second rotating structure. The tool head is switched between a third position and a fourth position. When in the third position, the central axis of the tool head intersects the central axis of the tool bar. When in the fourth position, the central axis of the tool head and the central axis of the tool bar are on the same line.

Optionally, the tool handle comprises three states. In a first state, the tool head is switched to the third position, the handle is switched to the first position, the handle and the tool head are respectively disposed on different sides of the tool bar, and the tool handle is in a Z-shaped structure. In a second state, the tool head is switched to the third position, the handle is switched to the second position, and the tool handle is in an L-shaped structure. In a third state, the tool head is switched to the fourth position, the handle is switched to the second position, and the tool handle is in an I-shaped structure. Optionally, a structure of the second rotating structure is same as a structure of the first rotating structure.

Optionally, the tool head is switchable to a fifth position. In the fifth position, the central axis of the tool head intersects the central axis of the tool bar. The tool head in the third position and the tool head in the fifth position are located on two sides of the central axis of the tool bar. The tool handle comprises following state. In a first state, the tool head is switched to the third position, the handle is switched to the first position, and the handle and the tool head are located on different sides of the tool bar. The tool handle is of a Z-shaped structure. In a second state, the tool head is switched to the third position, the handle is switched to the second position, and the tool handle is of an L-shaped structure. In a third state, the tool head is switched to the fourth position, the handle is switched to the second position, and the tool handle is of an I-shaped structure. In a fourth state, the tool head is switched to the fifth position, the handle is switched to the second position, and the tool handle is of an L-shaped structure. In a fifth state, the tool head is switched to the fifth position, the handle is switched to the first position, the handle and the tool head are located on the same side of the tool bar, and the tool handle is of a U-shaped structure.

Optionally, the second rotating structure comprises a third connecting head, a second positioning column, and a fourth connecting head. A third groove is defined on the fourth connecting head. The third connecting head is inserted into the third groove and is rotatable in the third groove. The third connecting head is rotatably disposed in the third groove through a second rotating shaft. A fourth groove is defined in a bottom surface of the third groove. The second positioning column is extendable or retractable from the fourth groove. The second positioning column is movably installed in the fourth groove. The second positioning column is connected to a bottom surface of the fourth groove through a second spring. A third positioning groove, a fourth positioning groove, and a fifth positioning groove are defined on an end portion of the third connecting head. The second positioning column is inserted into the third positioning groove, the fourth positioning groove, or the fifth positioning groove to enable the tool head to switch between the third position, the fourth position, and the fifth position. A surface, between the third positioning groove and the fourth positioning groove, of the end portion of the third connecting head and a surface, between the fourth positioning groove and the fifth positioning groove, of the end portion of the third connecting head are second arc-shaped curved surfaces.

Optionally, the third connecting head is disposed on the tool bar. The fourth connecting head is disposed on the tool head.

Optionally, second limiting protrusions are respectively disposed on one side of the third positioning groove away from the second arc-shaped curved surfaces and one side of the fifth positioning groove away from the second arc-shaped curved surfaces. A second spherical protrusion is disposed on one end of the second positioning column close to the third connecting head. The second spherical protrusion is matched with the third positioning groove, the fourth positioning groove, and the fifth positioning groove.

Optionally, when the handle is switched is switched to the first position, an angle between the handle and the tool bar is 85-95 degrees.

In the present disclosure, the handle is rotatably connected to the second end of the tool bar away from the tool head through the first rotating structure, and the handle is switched between the first position and the second position. When the handle is switched to the first position, the central axis of the handle and the central axis of the tool head are parallel to each other, and the tool bar acts as a torsion arm. Through such arrangement, it is convenient for an operator to hold the handle and quickly rotate or turn the tool handle, so that an operation is fast.

When the handle is switched to the second position, the central axis of the handle and the central axis of the tool bar are on the same line. The handle cooperates with the tool bar to form an extended moment arm. When a large torque is required to increase a fastening strength of a workpiece during workpiece installation or when a large torque is required to loosen the workpiece at a beginning of workpiece disassembly, the operator only needs to apply a small force to the handle through the extended moment arm to output high torque output and meet high torque requirements. At the same time, under same torque requirement, an existence of the handle shortens a length of the tool bar. In a case that the handle and the tool bar are acted as the extended moment arm, the handle and the tool bar are coaxially disposed to facilitate the storage of the tool handle.

The tool head is rotatably connected to the tool bar through the second rotating structure. The tool handle is able to switch between different states. When the tool handle is in the first state, the tool handle is of the Z-shaped structure, which is convenient for the operator to hold the handle and rotate the tool handle quickly, thereby increasing an installing speed or a disassembling speed of the workpiece. The torsion arm is the largest when the tool handle is in the second state. In the third state, the tool handle is of the I-shaped structure, so the tool handle is rotated quickly in scenes that require less torque and a small space, and is also convenient for storage.

When the tool head switches between the third position, the fourth position, and the fifth position, the tool handle has the fourth state and the fifth state. After the tool handle rotates at a certain angle, such as about 180°, the operator is able to switch the tool handle between the second state and the fourth state, so the operator can maintain an original force direction to rotate the tool handle without frequently replacing force directions. The tool handle in the fourth state is also suitable for some situations where space is limited and a large range of 360° rotation cannot be performed. When the tool handle is in the fifth state, the tool handle is of the U-shaped structure. When the tool handle is in the fifth state, the operator is able to install or disassemble the workpiece at a rear side of the workpiece, which is applicable to some special scenarios where there is no operating space on a front side of the workpiece.

In the first rotating structure and the second rotating structure, the first positioning column installed in the second groove cooperates with the first spring, so the first positioning column is automatically embedded in the first positioning groove or the second positioning groove, realizing accurate switching of the handle in the first position and the second position. The second positioning column installed in the fourth groove cooperates with the second spring, so the second positioning groove is automatically inserted into the third positioning slot, the fourth positioning slot, or the fifth positioning groove, realizing accurate switching of the tool head in the third position, the fourth position and the fifth position.

The first connecting head is disposed on the tool bar, and the second connecting head is disposed on the handle, which effectively prevents the operator from pinching his palm during a rotation of the handle.

DETAILED DESCRIPTION

Embodiment 1

Figure 1:
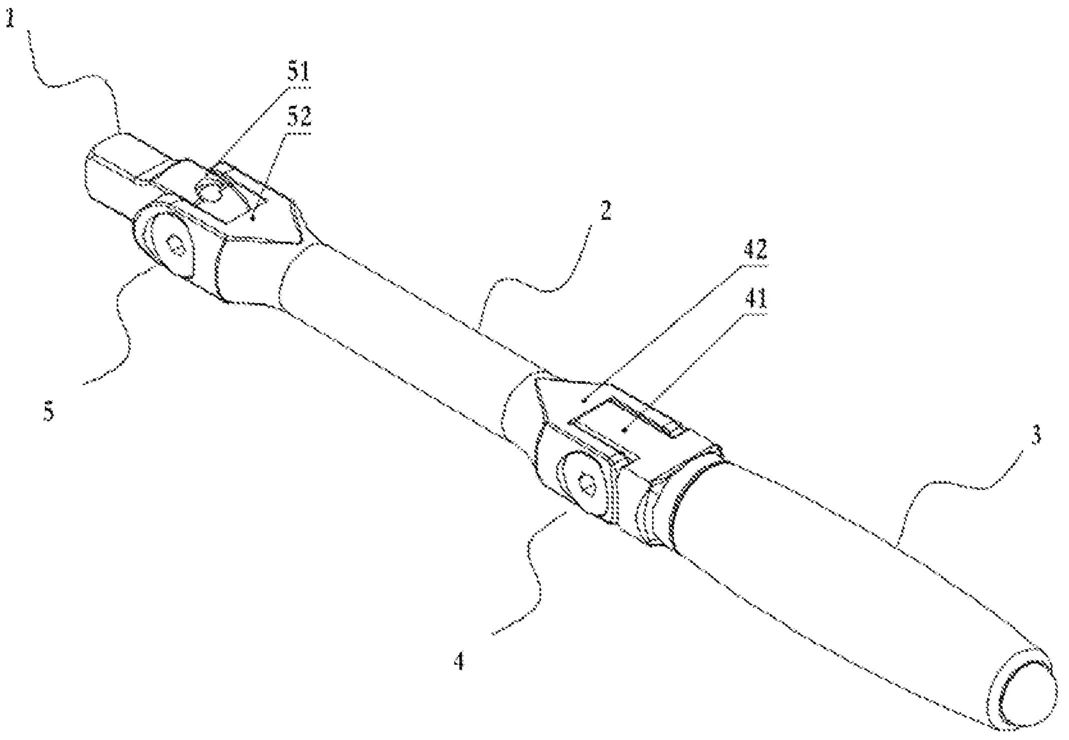
FIG. 1 is a schematic diagram of a tool handle according to Embodiment 1 of the present disclosure.

As shown in FIG. 1, the present disclosure provides the tool handle with the handle that is rotatable. The tool handle comprises a tool head 1, a tool bar 2, and the handle 3. The tool head 1, the tool bar 2, and the handle 3 are disposed in a same plane. The tool head 1 is connected to a first end of the tool bar 2. The handle 3 is rotatably connected to a second end, away from the tool head, of the tool bar 2 through a first rotating structure 4. The handle 3 is switched between a first position and a second position. When in the first position, a central axis of the handle 3 is parallel to a central axis of the tool head 1. When the handle 3 is switched to the first position, the central axis of the handle 3 and the central axis of the tool head 1 are parallel to each other, and the tool bar acts as a torsion arm. Through such arrangement, it is convenient for an operator to hold the handle 3 and quickly rotate or turn the tool handle, so that an operation is fast. When the handle 3 is switched is switched to the first position, an angle between the handle 3 and the tool bar is 85-95 degrees. In one optional embodiment, the angle between the handle 3 and the tool bar is 90 degrees.

When in the second position, the central axis of the handle 3 and a central axis of the tool bar 2 are on a same line. The handle 3 cooperates with the tool bar 2 to form an extended moment arm, which is labor-saving. At the same time, the handle 3 and the tool bar 2 are coaxially disposed to facilitate the storage of the tool handle.

In one specific embodiment, the tool head 1 is of a hexagonal rod-shaped structure or a quadrangular rod-shaped structure. The tool head 1 is rotatably connected to the tool bar 2 through a second rotating structure 5. The tool head 1 is switched between a third position and a fourth position.

When in the third position, the central axis of the tool head 1 intersects the central axis of the tool bar 2. When in the fourth position, the central axis of the tool head 1 and the central axis of the tool bar 2 are on the same line.

At this time, the tool handle comprises three states. In a first state, the tool head 1 is switched to the third position, the handle 3 is switched to the first position. The central axis of the tool head 1 intersects the central axis of the tool bar 2, and the central axis of the tool head is parallel to the central axis of the handle 3. Both of the tool head 1 and the handle 3 form an angle of 90° with the tool bar 2, and the handle 3 and the tool head 1 are respectively disposed on different sides of the tool bar 2. The tool handle is in a Z-shaped structure, which is convenient for the tool handle to rotate quickly. In addition, in the first state, the operator with weak arm strength is able to step on the handle with his feet and rely on his own body weight to apply force on the tool handle, so as to solve a problem that the operator needs to apply force to the handle by his hand only due to the extended moment arm of the tool handle of an L-shaped structure is too close to a workpiece.

In a second state, the tool head 1 is switched to the third position, the central axis of the tool head 1 intersects the central axis of the tool bar 2, and the angle between the tool head and the tool bar is 90 degrees. The handle 3 is switched to the second position. That is, the central axis of the handle 3 and the central axis of the tool bar 2 are on the same line, and the tool handle is in the L-shaped structure. The handle 3 cooperates with the tool bar 2 to form the extended moment arm, realizing output of a large torque.

In a third state, the tool head 1 is switched to the fourth position, and the handle 3 is switched to the second position. At this time, the central axis of the tool head 1, the central axis of the tool bar 2, and the central axis of the handle 3 are on the same line, and the tool handle is in an I-shaped structure. The tool handle in the third state is configured to connect to the workpiece in a small space, and is also convenient for storage.

In another specific embodiment of the present disclosure, the tool head 1 has a TORX hole structure, and the tool head 1 is fixedly connected to the tool bar 2. A central axis of the TORX hole structure of the tool head 1 intersects the central axis of the tool bar 2. Specifically, the central axis of the tool head 1 and the central axis of the tool bar 2 form an included angle of 90°. At this time, by adjusting a position of the handle 3, the tool handle has two states to meet work requirements.

In one state, the central axis of the handle 3 is parallel to the central axis of the TORX hole structure of the tool head 1. That is, the handle 3 is perpendicular to the tool bar 2, and the tool handle is in the L-shaped structure, which is convenient for the operator to hold the handle and rotate the tool handle quickly.

In the other state, the central axis of the handle 3 and the central axis of the tool bar 2 are on the same line. The tool handle is the I-shaped structure, and the handle 3 cooperates with the tool bar 2 to form the extended moment arm to realize the output of the large torque.

Figure 2:
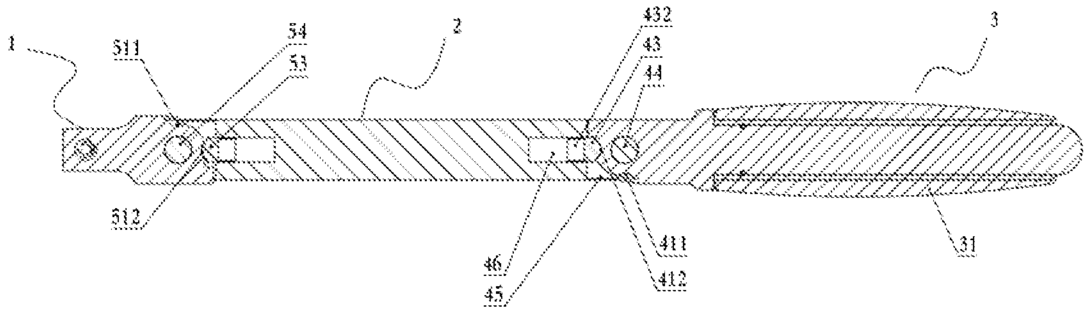
FIG. 2 is a cross-sectional schematic diagram of the tool handle according to Embodiment 1 of the present disclosure.
Figure 3:
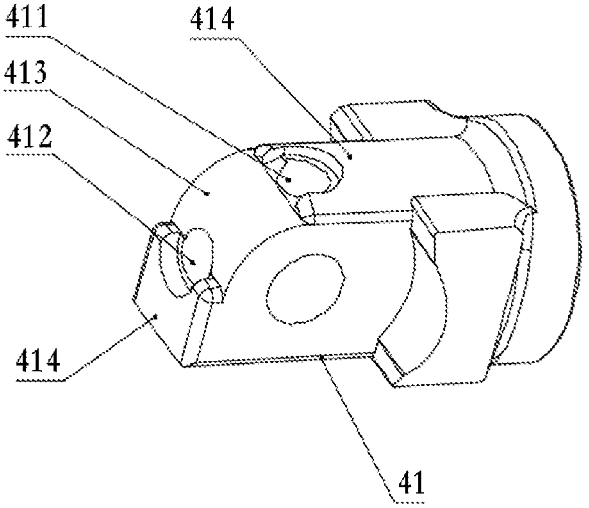
FIG. 3 is a schematic diagram of a first connecting head of the tool handle according to Embodiment 1 of the present disclosure.
Figure 4:
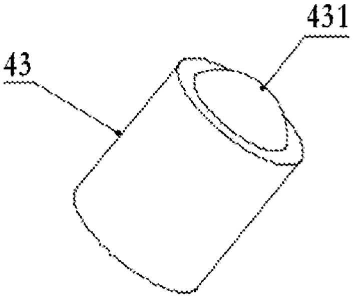
FIG. 4 is a schematic diagram of a first positioning column of the tool handle according to Embodiment 1 of the present disclosure.

A structure of the first rotating structure according to one specific embodiment is shown in FIGS. 2-4.

The first rotating structure comprises a first connecting head 41, a first positioning column 43, and a second connecting head 42. A first groove 45 is defined on the second connecting head 42. The first connecting head 41 is inserted into the first groove 45 and is rotatable in the first groove 45. The first connecting head 41 is rotatably disposed in the first groove 45 through a first rotating shaft 44.

First through holes are defined on two sides of the first groove 45. The first rotating shaft 44 is inserted into the first through holes. A second through hole is defined on the first connecting head 41. The first rotating shaft 44 passes through the second through hole. The first rotating shaft 44 passes through first through holes to connect to the second connecting head 42. A middle portion of the first rotating shaft 44 is movable in the second through hole, so that the first connecting head 41 is movably sleeved on an outer side of the first rotating shaft 44 and rotates around the first rotating shaft 44. A central axis of the first rotating shaft 44 is perpendicular to the central axis of the handle 3. A second groove 46 is defined in a bottom surface of the first groove 45. The first positioning column 43 is extendable or retractable from the second groove 46. The first positioning column 43 is movably installed in the second groove 46. The first positioning column 43 is connected to a bottom surface of the second groove 46 through a first spring (not shown in the drawings).

One side of the first positioning column 43 away from the first connecting head 41 defines an accommodating groove 432 for accommodating the first spring. A first end of the first spring enters the accommodating groove 432 and is connected to a bottom surface of the accommodating groove 432. A second end of the first spring is disposed in the second groove 46 and is connected to the bottom surface of the second groove 46.

A first positioning groove 411 and a second positioning groove 412 are defined on a side wall of the first connecting head 41. The first positioning column 43 is inserted into the first positioning groove 411 or the second positioning groove 412 to enable the handle 3 to switch between the first position and the second position. A surface of the side wall of the first connecting head 41 between the first positioning groove 411 and the second positioning groove 412 is a first arc-shaped curved surface 413.

A first spherical protrusion 431 is disposed on one end of the first positioning column 43 close to the first connecting head 41. The first spherical protrusion 431 is matched with the first positioning groove 411 and the second positioning groove 412.

When the handle is rotated, the spherical protrusion 431 contacts and slides on the first arc-shaped surface 413, and moves into the first positioning groove 411 or the second positioning groove 412 under an action of force of the first spring, so that the handle 3 is switched between the first position and the second position. Arrangements of the first positioning groove 411 and the second positioning groove 412 realize accurate positioning of the handle 3 between the first position and the second position, and effectively avoid positioning deviation due to inaccurate rotation angle of the handle, which prevents the handle 3 from falling off and hurting the operator during rotation. First limiting protrusions 414 are respectively disposed on one side of the first positioning groove 411 away from the first arc-shaped curved surface 413 and one side of the second positioning groove 414 away from the first arc-shaped curved surface. The first limiting protrusions 414 effectively prevent an operation error caused by reverse rotation of the handle. A handle cover 31 is coaxially sleeved on an outer side of the handle 3, which is convenient for the operator to rotate the handle 3.

In the embodiment, the first connecting head 41 is disposed on the handle 3, the second connecting head 42 is disposed on the tool bar 2.

In order to reduce production cost of the tool handle, as shown in FIGS. 1 and 2, when the tool head 1 and the tool bar 2 are connected through the second rotating structure 5, the second rotating structure 5 has a same structure as the first rotating structure 4. The second rotating structure 5 comprises a third connecting head 51 having a same structure as the first connecting head 41, a fourth connecting head 52 having a same structure as the second connecting head 42, a third positioning groove 511 having a same structure as the first positioning groove 411, a fourth position positioning groove 512 having a same structure as the second positioning groove, a second positioning column 53 having a same structure as the first positioning column 43, and a second rotating shaft 54 having a same structure as the first rotating shaft 44. The second rotating structure 5 further comprises other structures same as that of the first rotating structure. In the embodiment, a working principle of the second rotating structure 5 is same as that of the first rotating structure 4, which is not repeatedly illustrated therein. It should be noted that the third connecting head 51 of the second rotating structure 5 is disposed on the tool head 1, and the fourth connecting head 52 of the second rotating structure 5 is disposed on the tool bar 2.

Embodiment 2

Figure 5:
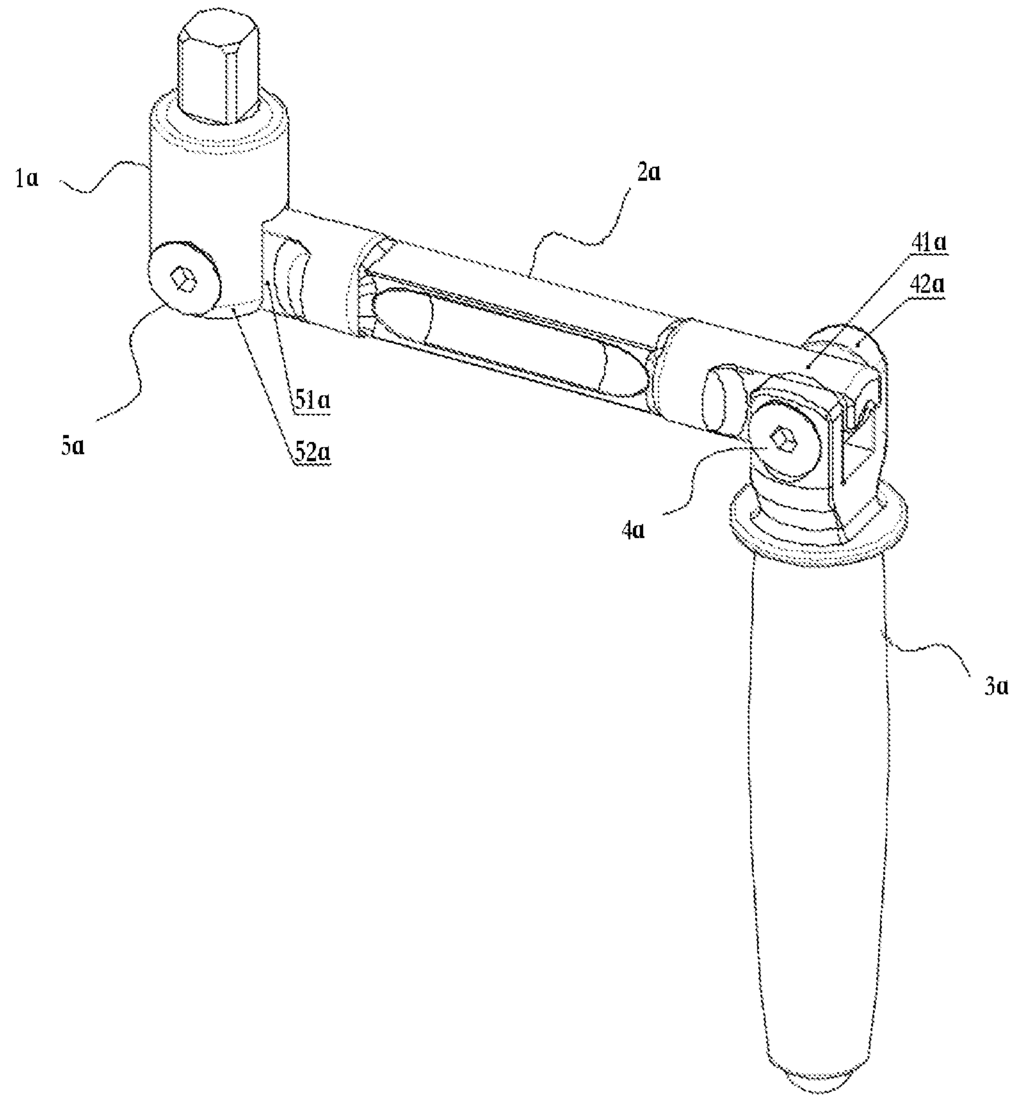
FIG. 5 is a perspective schematic diagram of the tool handle according to Embodiment 2 of the present disclosure.

As shown in FIG. 5, the present disclosure provides the tool handle with the handle that is rotatable. The tool handle comprises a tool head 1*a*, a tool bar 2*a*, and the handle 3*a*. The tool head 1*a*, the tool bar 2*a*, and the handle 3*a* are disposed in the same plane. The handle 3*a* is connected to two ends of the tool bar 2*a*.

The handle 3*a* is rotatably connected to a first end of the tool bar 2*a* through the first rotating structure 4*a*. The handle 3*a* is switched between a first position and a second position. When in the first position, a central axis of the handle 3*a* is parallel to a central axis of the tool head 1*a*. When in the second position, the central axis of the handle 3*s* and a central axis of the tool bar 2*a* are on a same line.

The tool head 1*a* is switchable between a third position, a fourth position, and a fifth position. When in the third position, the central axis of the tool head 1*a* intersects the central axis of the tool bar 2*a*. When in the fourth position, the central axis of the tool head 1*a* and the central axis of the tool bar 2*a* are on the same line. In the fifth position, the central axis of the tool head 1*a* intersects the central axis of the tool bar 2*a*. The tool head 1*a* in the third position and the tool head 1*a* in the fifth position are located on two sides of the central axis of the tool bar 2*a*.

In the embodiment, an included angle between an axis of the handle 3*a* in the first position and an axis of the tool bar 2*a* is 90°; and an included angle between an axis of the tool head 1*a* and an axis of the tool bar 2*a* in the third position or the fifth position is also 90°.

Figure 6:
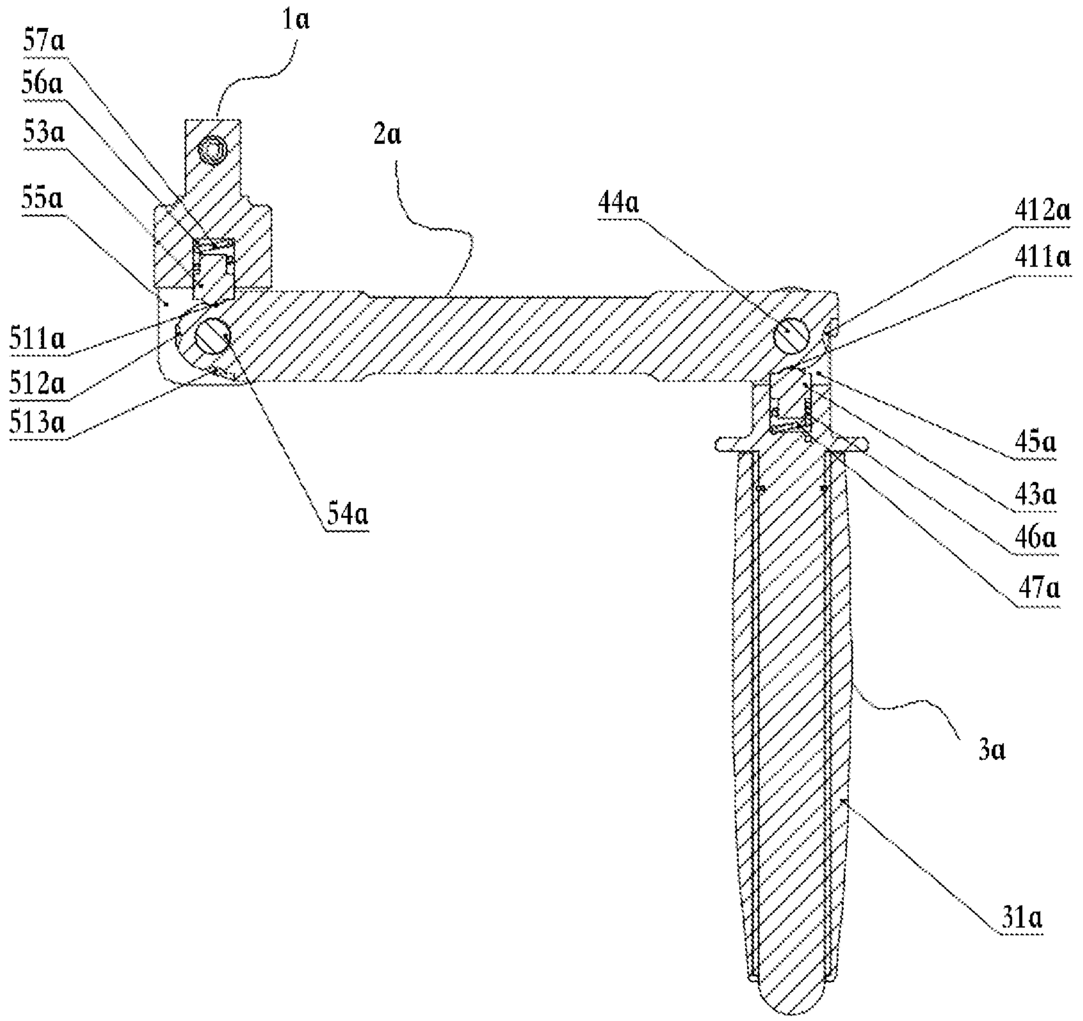
FIG. 6 is a schematic diagram of the tool handle shown in a first state according to Embodiment 2 of the present disclosure.
Figure 7:
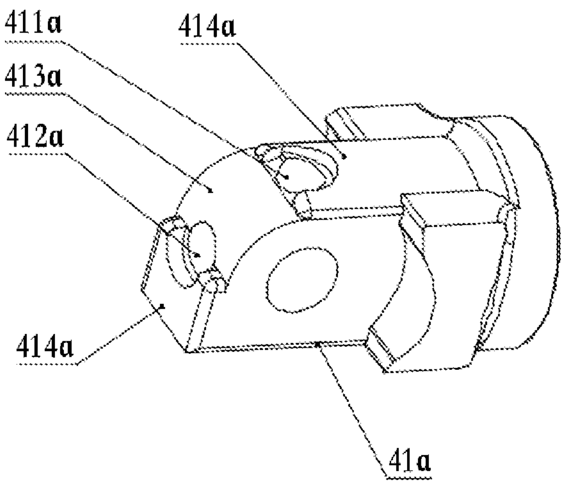
FIG. 7 is a schematic diagram of a first connecting head of the tool handle according to Embodiment 2 of the present disclosure.
Figure 8:
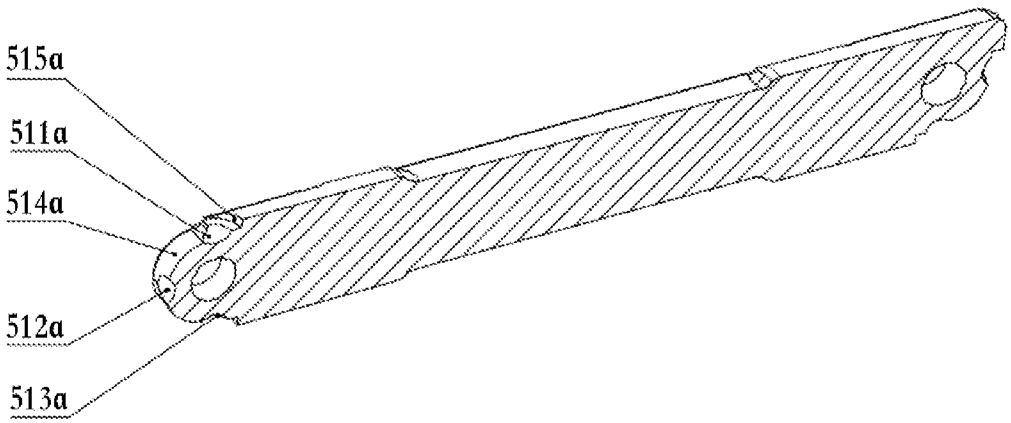
FIG. 8 is a schematic diagram of a tool bar of the tool handle according to Embodiment 2 of the present disclosure.

In one specific embodiment of the present disclosure, as shown in FIGS. 6-8, the first rotating structure 4*a* comprises a first connecting head 41*a*, a first positioning column 43*a*, and a second connecting head 42*a*. The first connecting head 41*a* is disposed on the tool bar 2*a*, and the second connecting head 42*a* is disposed on the handle 3*a*.

A first groove 45*a* is defined on the second connecting head 42*a*. The first connecting head 41*a* is inserted into the first groove 45*a* and is rotatable in the first groove 45*a*. The first connecting head 41*a* is rotatably disposed in the first groove 45*a* through a first rotating shaft 44*a*. First through holes are defined on two sides of the first groove 45*a*. The first rotating shaft 44*a* is inserted into the first through holes. A second through hole is defined on the first connecting head 41*a*. The first rotating shaft 44*a* passes through the second through hole. The first rotating shaft 44*a* passes through first through holes to connect to the second connecting head 42*a*. A middle portion of the first rotating shaft 44*a* is movable in the second through hole, so that the first connecting head 41*a* is movably sleeved on an outer side of the first rotating shaft 44*a* and rotates around the first rotating shaft 44*a*. A central axis of the first rotating shaft 44*a* is perpendicular to the central axis of the handle 3*a*. A second groove 46*a* is defined in a bottom surface of the first groove 45*a*. The first positioning column 43*a* is extendable or retractable from the second groove 46*a*. The first positioning column 43*a* is movably installed in the second groove 46*a*. The first positioning column 43*a* is movably installed in the second groove 46*a* and is connected to a bottom surface of the second groove 46*a* through a first spring 47*a*.

In the embodiment, one end of the first positioning column 43*a* close to the first spring 47*a* is an outer stepped cylindrical structure, which is convenient for one end of the first spring 47*a* to sleeve and fix.

A first positioning groove 411*a* and a second positioning groove 412*a* are defined on a side wall of the first connecting head 41*a*. The first positioning column 43*a* is inserted into the first positioning groove 411*a* or the second positioning groove 412*a* to enable the handle 3*a* to switch between the first position and the second position. A surface of the side wall of the first connecting head 41*a* between the first positioning groove 411*a* and the second positioning groove 412*a* is a first arc-shaped curved surface 413*a*.

A first spherical protrusion is disposed on one end of the first positioning column 43*a* close to the first connecting head 41*a*. The first spherical protrusion is matched with the first positioning groove 411*a* and the second positioning groove 412*a*. When the handle is rotated, the spherical protrusion contacts and slides on the first arc-shaped surface 413*a*, and moves into the first positioning groove 411*a* or the second positioning groove 412*a* under an action of deforming force of the first spring 47*a*, so that the handle 3*a* is switched between the first position and the second position. Arrangements of the first positioning groove 411*a* and the second positioning groove 412*a* realize accurate positioning of the handle 3*a* between the first position and the second position, and effectively avoid positioning deviation due to inaccurate rotation angle of the handle. First limiting protrusions 414*a* are respectively disposed on one side of the first positioning groove 411*a* away from the first arc-shaped curved surface 413*a* and one side of the second positioning groove 414*a* away from the first arc-shaped curved surface. The first limiting protrusions 414*a* are configured to cooperate with the first connecting head 41*a* and the first positioning column 43*a* to limit rotation of the handle 3*a* with respect the tool bar 2*a*.

For ease of use, a handle cover 31*a* is coaxially sleeved on an outer side of the handle 3*a*.

The second rotating structure comprises a third connecting head 51*a*, a second positioning column 53*a*, and a fourth connecting head 52*a*. In the embodiment, the third connecting head 51*a* is disposed on the tool bar 2*a*. The fourth connecting head 52*a* is disposed on the tool head 1*a*.

A third groove 55*a* is defined on the fourth connecting head 52*a*. The third connecting head 51*a* is inserted into the third groove 55*a* and is rotatable in the third groove 55*a*. The third connecting head 51*a* is rotatably disposed in the third groove 55*a* through a second rotating shaft 54*a*. A fourth groove 56*a* is defined in a bottom surface of the third groove 55*a*. The second positioning column 53*a* is extendable or retractable from the fourth groove 56*a*. The second positioning column 53*a* is movably installed in the fourth groove 56*a*. The second positioning column 53*a* is connected to a bottom surface of the fourth groove 56*a* through a second spring 57*a*. The second positioning post 53*a* protrudes outward under the elastic force of the second spring 57*a* and abuts against an end surface of the third connecting head 51*a*.

A third positioning groove 511*a*, a fourth positioning groove 512*a*, and a fifth positioning groove 513*a* are defined on the end portion of the third connecting head 51*a*. The second positioning column 53*a* is inserted into the third positioning groove 511*a*, the fourth positioning groove 512*a*, or the fifth positioning groove 513*a* to enable the tool head 1*a* to switch between the third position, the fourth position, and the fifth position. For smooth positioning, a surface, between the third positioning groove 511*a* and the fourth positioning groove 512*a*, of the end portion of the third connecting head 51*a* and a surface, between the fourth positioning groove 512*a* and the fifth positioning groove 513*a*, of the end portion of the third connecting head 51*a* are second arc-shaped curved surfaces 514*a*.

The third positioning groove 511*a*, the fourth positioning groove 512*a*, and the fifth positioning groove 513*a* are recessed hemispherical grooves or grooves in a shape similar to a hemisphere.

A second spherical protrusion is disposed on one end of the second positioning column 53*a* close to the third connecting head. The second spherical protrusion is matched with the third positioning groove 511*a*, the fourth positioning groove 512*a*, and the fifth positioning groove 513*a*.

Second limiting protrusions 515*a* are respectively disposed on one side of the third positioning groove 511*a* away from the second arc-shaped curved surfaces and one side of the fifth positioning groove 513*a* away from the second arc-shaped curved surfaces. The second limiting protrusions 515*a* are configured to limit the rotation of the tool bar 2*a* with respect to the tool head 1*a* in the third position or the five position.

Positions of the handle 3*a* and the tool head 1*a* with respect to the tool bar 2*a* are adjusted by the first rotating structure and second rotating structure, so that the tool handle has following states:

In a first state, as shown in FIG. 5, the tool head 1*a* is switched to the third position, the handle is switched to the first position, a top end of the second positioning column 53*a* is embedded into the third positioning groove 511*a*, the handle 3*a* is switched to the first position. A top end of the first positioning column 43*a* is embedded into the first positioning groove 411*a*. At this time, the handle 3*a* and the tool head 1*a* are located on different sides of the tool bar 2*a*. The tool handle is of a Z-shaped structure. In the first state, an accessory may be installed on the tool head 1*a*. For example, an inner hexagon sleeve is quickly installed on the tool head 1*a*, and the inner hexagon sleeve is sleeved on a head of the bolt, so the operator is able to hold the handle and rotate the handle quickly to fix or disassemble the bolt, which improves a speed of installation and removal.

Figure 9:
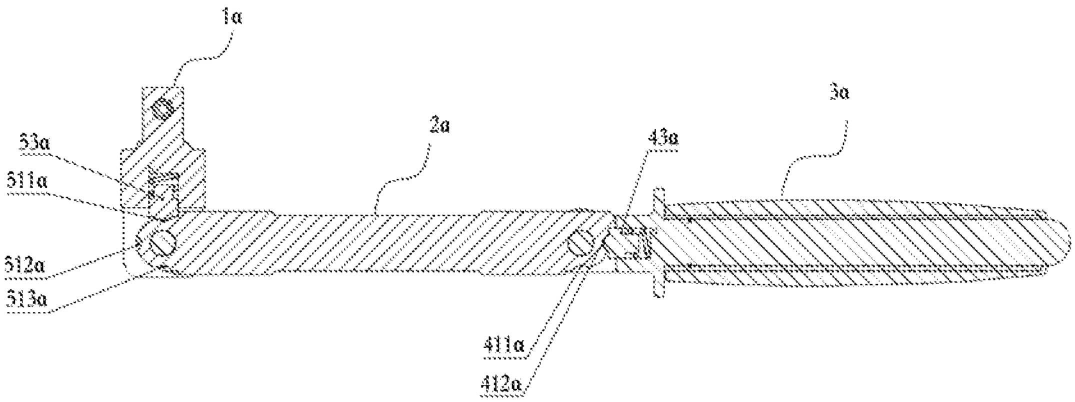
FIG. 9 is a schematic diagram of the tool handle shown in a second state according to Embodiment 2 of the present disclosure.

In a second state, as shown in FIG. 9, the tool head 1*a* is switched to the third position, the handle is switched to the second position, the top end of the second positioning column 53*a* is embedded in the third positioning groove 511*a*, the handle 3*a* is switched to the second position, and the top end of the first positioning column 43*a* is embedded in the second positioning groove 412*a*. At this time, the tool handle is of an L-shaped structure. The handle 3*a* and the tool bar 2*a* are located on the same axis, and cooperate together to form an extended moment arm. In a beginning of installation and disassembly of the workpiece, the operator only needs to apply a small force to the handle to input the large torque. Of course, in the second state, the tool handle also reduces the force need to be applied during normal rotation.

Figure 10:
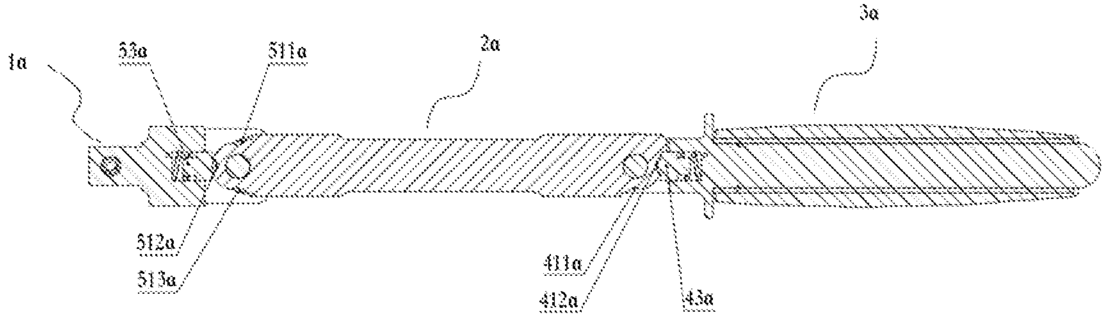
FIG. 10 is a schematic diagram of the tool handle shown in a third state according to Embodiment 2 of the present disclosure.

In a third state, as shown in FIG. 10, the tool head 1*a* is switched to the fourth position, the top end of the second positioning column 53_a_ is embedded in the fourth positioning groove 512_a_, the handle 3_a_ is switched to the second position, and the top end of first positioning column 43_a_ is embedded in the second positioning groove 412_a_. At this time, the tool handle is of an I-shaped structure. In the third state, the tool head 1_a_, the tool bar 2_a_, and the handle 3_a_ are located on the same axis, so the tool handle is rotated quickly in scenes that require less torque and a small space, and is also convenient for storage.

Figure 11:
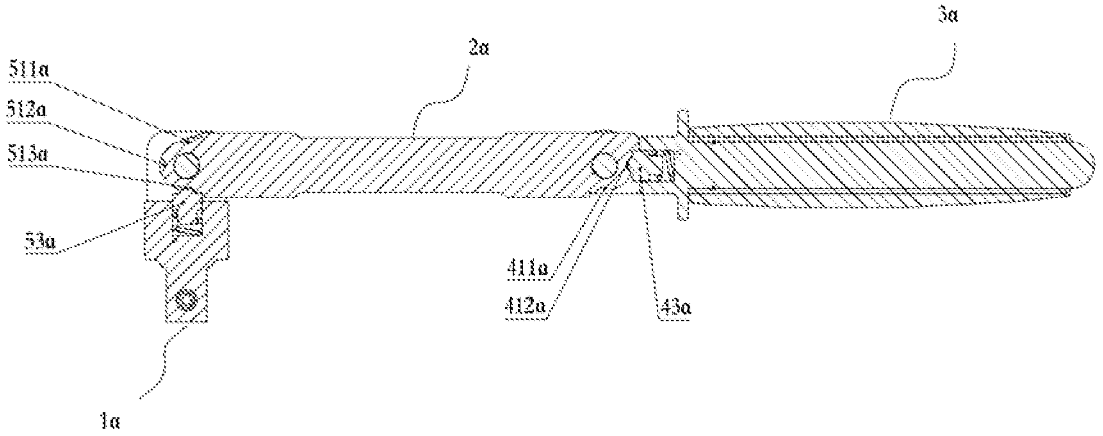
FIG. 11 is a schematic diagram of the tool handle shown in a fourth state according to Embodiment 2 of the present disclosure.

In a fourth state, as shown in FIG. 11, the tool head 1_a_ is switched to the fifth position, the top end of the second positioning column 53_a_ is embedded in the fifth position positioning groove 513_a_, the handle 3_a_ is switched to the second position, and the first positioning column 43_a_ is embedded in the second position positioning groove 412_a_. At this time, the tool handle is of an L-shaped structure. A usage scenario of the fourth state is the same as that of the second state. The operator is able to switch the tool handle between the second state and the fourth state, so the operator can maintain an original force direction to rotate the tool handle without frequently replacing force directions. The tool handle in the fourth state is also suitable for some situations where space is limited and a large range of 360° rotation cannot be performed.

Figure 12:
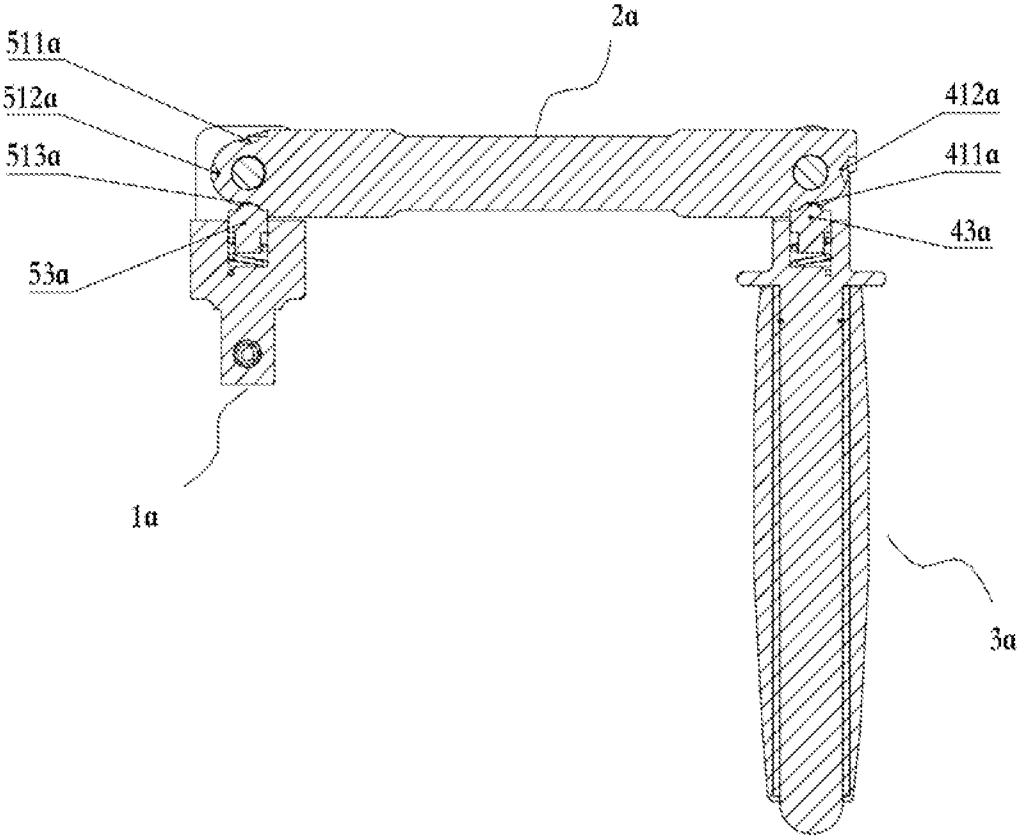
FIG. 12 is a schematic diagram of the tool handle shown in a fifth state according to Embodiment 2 of the present disclosure.

In a fifth state, as shown in FIG. 12, the tool head 1_a_ is switched to the fifth position, the top end of the second positioning column 53_a_ is embedded in the fifth positioning groove 513_a_, the handle 3_a_ is switched to the first position, the top end of the first positioning column 43_a_ is embedded in the first positioning groove 411_a_, the handle 3_a_ and the tool head 1_a_ are located on the same side of the tool bar 2_a_, and the tool handle is of a U-shaped structure. When the tool handle is in the fifth state, the operator is able to install or disassemble the workpiece at a rear side of the workpiece, which is applicable to some special scenarios where there is no operating space on a front side of the workpiece.

Embodiment 3

Figure 13:
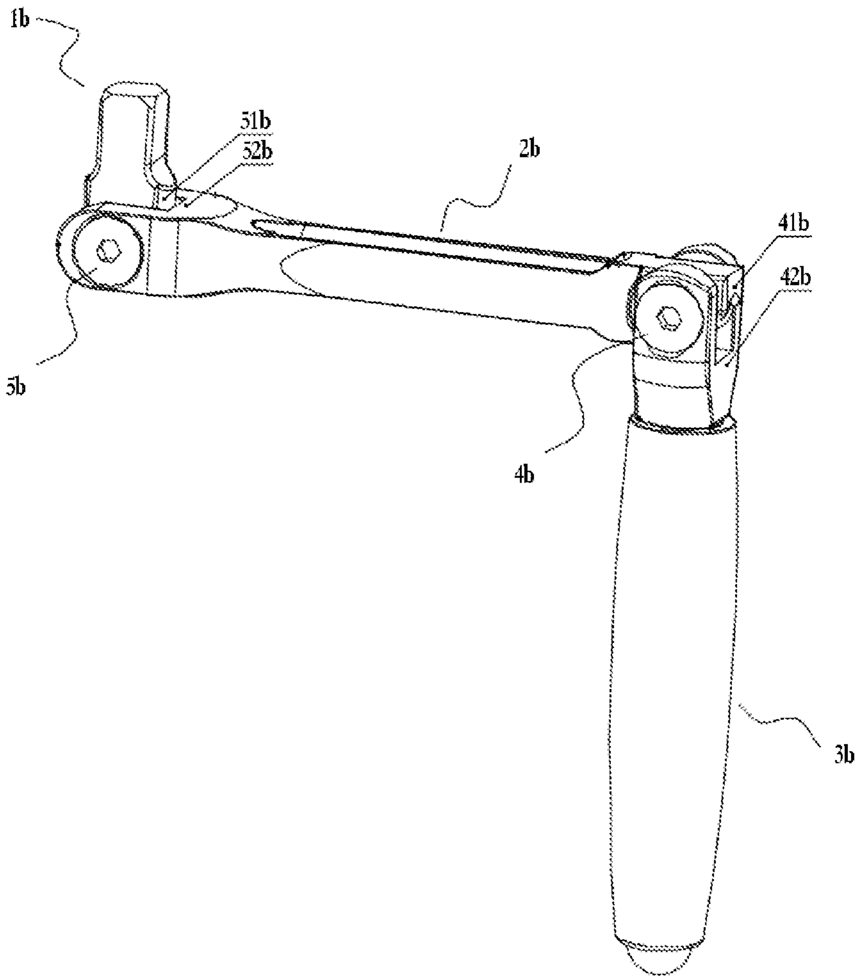
FIG. 13 is a schematic diagram of the tool handle according to Embodiment 3 of the present disclosure.
Figure 14:
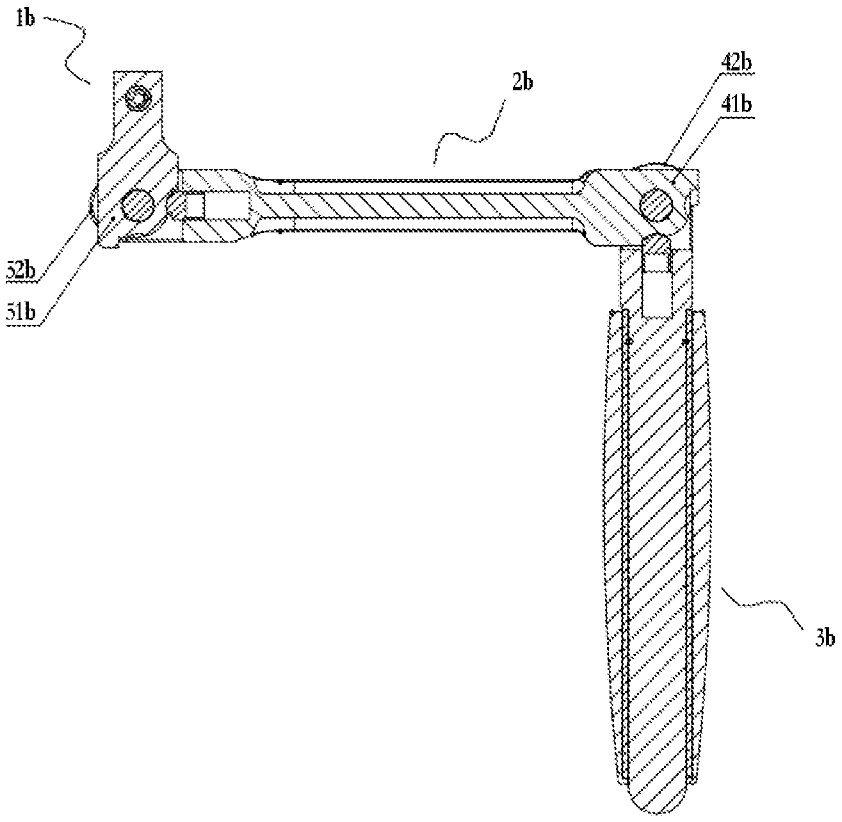
FIG. 14 is a cross-sectional schematic diagram of the tool handle according to Embodiment 3 of the present disclosure.

As shown in FIGS. 13 and 14, the present disclosure provides the tool handle with the handle that is rotatable. The tool handle comprises a tool head 1_b_, a tool bar 2_b_, and the handle 3_b_. The handle 3_b_ is rotatably connected to a first end of the tool bar 2_a_ through a first rotating structure 4_b_. The tool head 1_b_ is rotatably connected to a second end of the tool bar 2_b_ through a second rotating structure 5_b_.

In the embodiment, the tool bar 2_b_ is a square steel structure with an H-shaped cross section.

The first rotating structure 4_b_ is same as the first rotating structure 4_a_ of the embodiment 2, and an installation form thereof is also the same. The first connecting head 41_b_ is installed on the tool bar 2_b_, and the second connecting head 42_b_ is installed on the handle 3_b_. Compared with the first connecting head 41, disposed on the handle 3, of the first rotating structure in the embodiment 1 and the second connecting head 42 disposed on the tool bar 2, when fingers of the operation move to the first rotating structure 4_b_, the fingers are effectively prevented from being crushed.

The second rotating structure 5_b_ is completely the same as the second rotating structure 5 in the embodiment 1. The third connecting head 51_b_ is disposed on the tool head 1, and the fourth connecting head 52 _b_ is disposed on the tool bar 2.

In the embodiment, working principles of the first rotating structure 4_b_ and the second rotating structure 5_b_ can be respectively referred to the first rotating structure 4_a_ in the embodiment 2 and the second rotating structure 5 in the embodiment 1. Then a position of the handle 3_b_ with respect to the tool bar 2_b_ is adjusted through the first rotating structure 4_b_, and a position of the tool head 1_b_ with respect to the tool bar 2_b_ is adjusted through the second rotating structure 5_b_, so that the tool handle is switched between a Z-shaped structure, an L-shaped structure, and an I-shaped structure.

What is claimed is:

1. A tool handle with a handle that is rotatable, comprising:

a tool head, a tool bar, and the handle, configured to be manually operated by a human hand or foot;

wherein the tool head, the tool bar, and the handle are disposed in a same plane, wherein the tool bar has an axial length greater than an axial length of the tool head to define an extended lever arm configured to amplify output torque upon manual force input for labor-saving fastening or unfastening operation; the handle is rotatably connected to a second end, away from the tool head, of the tool bar through a first rotating structure; wherein the handle is configured to be switched between a first position and a second position;

when in the first position, a central axis of the handle is parallel to a central axis of the tool head;

when in the second position, the central axis of the handle and a central axis of the tool bar are on a same line;

wherein the first rotating structure comprises a first connecting head, a first positioning column, and a second connecting head; wherein a first groove is defined in the second connecting head; wherein the first connecting head is inserted into the first groove and is rotatable in the first groove; wherein the first connecting head is rotatably disposed in the first groove through a first rotating shaft; wherein a second groove is defined in a bottom surface of the first groove; wherein the first positioning column is extendable or retractable from the second groove and is slidably mounted within the second groove; wherein the first positioning column is coupled to a bottom surface of the second groove via a first spring such that spring force transfers sequentially from the first spring to a body of the first positioning column then to a first spherical protrusion formed integrally at an end of the first positioning column facing toward the first connecting head to realize three-stage force transmission; wherein the first spherical protrusion is configured to be fitted with a first positioning groove or the second positioning groove;

wherein a first positioning groove and a second positioning groove are defined in a side wall of the first connecting head; wherein the first positioning column is configured to be inserted into the first positioning groove or the second positioning groove to enable the handle to switch between the first position and the second position; wherein a surface of the side wall of the first connecting head between the first positioning groove and the second positioning groove is a first arc-shaped curved surface.

2. The tool handle according to claim 1, wherein the first connecting head is disposed on the tool bar, the second connecting head is disposed on the handle.

3. The tool handle according to claim 1, wherein first limiting protrusions are respectively disposed on one side of the first positioning groove away from the first arc-shaped curved surface and one side of the second positioning groove away from the first arc-shaped curved surface, each of the first limiting protrusions is formed with an inclined guide slope to block over-rotation of the first positioning column and guide sliding movement of the first spherical protrusion along the first arc-shaped curved surface during handle position switching, wherein the first limiting protrusions are configured to cooperate with the first connecting head and the first positioning column to limit a rotation of the handle with respect to the tool bar.

4. The tool handle according to claim 1, wherein the tool head has a TORX hole structure, and the tool head is fixedly connected to the tool bar.

5. The tool handle according to claim 1, wherein the tool head is of a hexagonal rod-shaped structure or a quadrangular rod-shaped structure; the tool head is rotatably connected to the tool bar through a second rotating structure; the tool head is switched between a third position and a fourth position;

when in the third position, the central axis of the tool head intersects the central axis of the tool bar;

when in the fourth position, the central axis of the tool head and the central axis of the tool bar are on the same line.

6. The tool handle according to claim 5, wherein the tool handle comprises three states:

in a first state, the tool head is switched to the third position, the handle is switched to the first position, the handle and the tool head are respectively disposed on different sides of the tool bar, and the tool handle is in a Z-shaped structure;

in a second state, the tool head is switched to the third position, the handle is switched to the second position, and the tool handle is in an L-shaped structure;

in a third state, the tool head is switched to the fourth position, the handle is switched to the second position, and the tool handle is in an I-shaped structure.

7. The tool handle according to claim 6, wherein a structure of the second rotating structure is same as a structure of the first rotating structure.

8. The tool handle according to claim 5, wherein the tool head is switchable to a fifth position; in the fifth position, the central axis of the tool head intersects the central axis of the tool bar; the tool head in the third position and the tool head in the fifth position are relatively located on two sides of the central axis of the tool bar;

wherein the tool handle comprises following states:

in a first state, the tool head is switched to the third position, the handle is switched to the first position, and the handle and the tool head are located on different sides of the tool bar; the tool handle is of a Z-shaped structure;

in a second state, the tool head is switched to the third position, the handle is switched to the second position, and the tool handle is of an L-shaped structure;

in a third state, the tool head is switched to the fourth position, the handle is switched to the second position, and the tool handle is of an I-shaped structure;

in a fourth state, the tool head is switched to the fifth position, the handle is switched to the second position, and the tool handle is of an L-shaped structure;

in a fifth state, the tool head is switched to the fifth position, the handle is switched to the first position, the handle and the tool head are located on the same side of the tool bar, and the tool handle is of a U-shaped structure.

9. The tool handle according to claim 8, wherein the second rotating structure comprises a third connecting head, a second positioning column, and a fourth connecting head;

wherein a third groove is defined on the fourth connecting head; the third connecting head is inserted into the third groove and is rotatable in the third groove; the third connecting head is rotatably disposed in the third groove through a second rotating shaft; a fourth groove is defined in a bottom surface of the third groove; the second positioning column is extendable or retractable from the fourth groove; the second positioning column is movably installed in the fourth groove; the second positioning column is connected to a bottom surface of the fourth groove through a second spring;

a third positioning groove, a fourth positioning groove, and a fifth positioning groove are defined on an end portion of the third connecting head; the second positioning column is inserted into the third positioning groove, the fourth positioning groove, or the fifth positioning groove to enable the tool head to switch between the third position, the fourth position, and the fifth position; a surface, between the third positioning groove and the fourth positioning groove, of the end portion of the third connecting head and a surface, between the fourth positioning groove and the fifth positioning groove, of the end portion of the third connecting head are second arc-shaped curved surfaces.

10. The tool handle according to claim 9, wherein the third connecting head is disposed on the tool bar; the fourth connecting head is disposed on the tool head.

11. The tool handle according to claim 9, wherein second limiting protrusions are respectively disposed on one side of the third positioning groove away from the second arc-shaped curved surfaces and one side of the fifth positioning groove away from the second arc-shaped curved surfaces; a second spherical protrusion is disposed on one end of the second positioning column close to the third connecting head; the second spherical protrusion is matched with the third positioning groove, the fourth positioning groove, and the fifth positioning groove.

12. The tool handle according to claim 1, wherein when the handle is switched is switched to the first position, an angle between the handle and the tool bar is 85-95 degrees.

* * * * *